United States Patent [19]

Stolzer

[11] Patent Number: 4,881,634

[45] Date of Patent: Nov. 21, 1989

[54] REPOSITIONING APPARATUS FOR ELONGATED GOODS, ESPECIALLY LOADING AND UNLOADING APPARATUS FOR RAILS, STRIPS, OR THE LIKE, ON OR FROM A ROLLER CONVEYOR

[75] Inventor: Armin Stolzer, Renchen, Fed. Rep. of Germany

[73] Assignee: KEURO Maschinenbau Gesellschaft mit beschrankter Haftung & Co. Kommanditgesellschaft, Achern-Gamshurst, Fed. Rep. of Germany

[21] Appl. No.: 248,778

[22] Filed: Sep. 23, 1988

[30] Foreign Application Priority Data

Oct. 26, 1987 [DE] Fed. Rep. of Germany ..... 37361228

[51] Int. Cl.⁴ .............................................. B65G 37/00
[52] U.S. Cl. ................. 198/372; 198/468.6; 414/276; 414/745.7
[58] Field of Search ............ 198/372, 366, 436, 468.6, 198/448; 414/276, 281, 746.8, 745.7, 22.62

[56] References Cited

U.S. PATENT DOCUMENTS

| | | | |
|---|---|---|---|
| 1,760,875 | 6/1930 | Little | 198/372 |
| 4,057,138 | 11/1977 | Grebe | 198/372 |
| 4,372,724 | 2/1983 | Stolzer | 414/281 |
| 4,488,847 | 12/1989 | Stolzer | 414/288 |
| 4,625,855 | 12/1986 | Klaus | 198/372 X |
| 4,708,566 | 11/1987 | Stolzer et al. | 414/746.8 X |
| 4,739,874 | 4/1988 | Akutagawa et al. | 198/468.6 X |

FOREIGN PATENT DOCUMENTS 0154865 4/1982 German Democratic Rep. .

Primary Examiner—Frank E. Werner
Assistant Examiner—Cheryl L. Gastineau
Attorney, Agent, or Firm—Frishauf, Holtz, Goodman & Woodward

[57] ABSTRACT

To permit loading of elongated goods such as rails, rods, strips, or a combination of the foregoing retained in cassettes, from support shelves located on stacks positioned on both sides of a gang way or corridor in which a roller conveyor (13) is located, a frame element (5) carries thereon guide track supports (11, 12) which are positioned in essentially V configuration. Movable support elements, preferably connected by a longitudinal beam, and operated by cylinder-piston units move the goods from a raised transfer position to or from a hoist to a position out of the roller conveyor. The goods can be moved by the hoist from the storage stacks to either one of the support elements which, then, can move on the inclined tracks from the side of the roller conveyor to beneath the rolls of the roller conveyor. The respective support elements (8, 9) on either side are independently movable so that material which previously was handled on the support element on one of the legs of the V can be removed and the support elements reloaded with new goods while goods which are, in the meanwhile, on the roller conveyor, are being worked on, for example by a cutting saw or the like.

14 Claims, 5 Drawing Sheets

REPOSITIONING APPARATUS FOR ELONGATED GOODS, ESPECIALLY LOADING AND UNLOADING APPARATUS FOR RAILS, STRIPS, OR THE LIKE, ON OR FROM A ROLLER CONVEYOR

Reference to related patents, the disclosure of which is hereby incorporated by reference:
U.S. Pat. No. 4,372,724, Stolzer, Feb. 8, 1983
U.S. Pat. No. 4,488,847, Stolzer, Dec. 18, 1984.
Reference to related publication: GDR Patent No. DD 0154 685, Estenfelder et al.

The present invention relates to material handling, and more particularly to handling of elongated material such as rails, strips, elongated extrusions and the like, and more particularly to transfer of such material between storage racks and a roller conveyor. The roller conveyor may transfer the elongated material to a cutting or severing machine, to cut the elongated strips, bars, rails, or the like, into predetermined lengths. The apparatus is specifically intended to load the roller conveyor and to remove from the roller conveyor strips, bars, rods or rails which have previously been severed, which may be left-overs, or the like, or which have been cut to length.

BACKGROUND

The handling of elongated goods frequently is time and space-consuming. This is particularly so if the goods are to be handled for loading and unloading of a roller conveyor, to supply to goods, then, to a cutting or severing machine. Some of the goods may be individual rails, rods, or the like, whereas others may be associated in groups or held together in cassettes or other handling devices. It is equally difficult, at times, to load and unload cassettes with elongated goods, for example to transport a group of such goods in the cassettes for individual removal at a later time, or at a remote location.

Frequently, a cutter or severing machine is associated with a roller conveyor. Such cutters may, for example, be cold cutting circular saws, band saws, or other severing apparatus. The roller conveyor then supplies the elongated material or goods to the respective cutter apparatus. It is necessary to place the material on the roller conveyor and to remove, after cutting, from the supply roller conveyor left-over pieces and from the removal roller conveyor pieces which have been cut to length or size. A defined positioning of the goods with respect to the severing or cutting machine can be obtained by forming the roller conveyor in V configuration; the cutting machine itself can customarily be adjusted to fit the requirements of the goods to be cut. A frequently used arrangements is to provide a lateral register or indexing stop for the goods in advance of the cutting machine; such lateral stops may also be provided on the roller conveyor. If the goods are joined together, or all located in a cassette, the cassette itself may be transported by the roller conveyor, and, projecting ends of goods cut to predetermined length of goods while within the cassette.

Frequently, a crane or traveling hoist is used to load the roller conveyor with goods taken from storage racks located adjacent the roller conveyor. The hoist or traveling crane customarly has a support formed with projecting tines or forks. The material is removed from storage racks, transported to the roller conveyor, and any material on the roller conveyor which may be cut remainders, or cut-to-size goods, are returned to the storage racks. For easy loading and unloading, a portion of the roller conveyor, and frequently the one immediately associated with the cutting machine, is located parallel to the elongated goods within the storage area for the elongated goods. This permits movement of the goods between a storage position and a roller conveyor in a direction which extends only perpendicularly to the longitudinal extend of the goods, and moves them vertically and horizontally.

Typical storage racks for elongated goods are formed by groups of vertically staggered support brackets, shelves, or the like, and so arranged that the hoist can be moved with its forks or tines between support structures, slightly dropped below the bottom surface of the goods to be then raised, pick up the goods, and transport them to the roller conveyor. To save time and provide for efficient machine utilization, the travel times of the crane or hoist are so selected that in the region of the roller conveyor, intermediate storage and repositioning places are provided, so that, when the roller conveyor has transported a certain strip, rail bar or rod or the like, to the processing machine, the hoist can, in the meanwhile, reposition or handle other goods, for example place goods for a next working step in a temporary storage or holding position and remove previously cut material for placement on the respective shelves or brackets associated with the particular goods. Efficient operation of the system thus permits placement next to the roller conveyor material to be next worked on as soon as working of the immediately preceding material has been terminated; the previously worked-on material need then only be removed from the roller conveyor, to be replaced by the next to-be-worked-on material. The possible remainder, and any other material, can be returned to the main storage place during working on or cutting of the next one of the goods. This arrangement permits practically continuous operation of the cutting and severing machine. If sufficient material is available for working-on by the severing machine, usually sufficient time will be available so that any remnants or cut-off pieces can be returned by the crane or hoist to the appropriate storage place and to then supply the next elongated material for handling by the severing machine.

The referenced U.S. Pat. Nos. 4,372,724 and 4,488,847, by the inventor hereof, are directed to handling of elongated goods and reference is made thereto for further description of suitable storage and material handling structures.

Numerically controlled systems can be used to control the movement of a crane or hoist, support structures, and possible storage structures in relation to the operating cycle of the material severing or other machine. The numerical control can be so arranged that the structure of the storage racks and the location of the material thereon can be considered. The individual sequence of operation can be controlled, or automatically determined, and the disclosures of the referenced U.S. Pat. Nos. 4,372,724 and 4,488,847 are hereby incorporated by reference.

Various structures are so arranged that the roller conveyor can be loaded or unloaded only from one side by a carrier support, either with new material or removal of cut material. Loading from one side may be determined by register or alignment stops. If the roller conveyor can be reached only from one side by a loading crane structure or the like, support structures for goods to be handled can be provided only on one side, and the respective storage shelves, bins, or brakcets to supply the elongated rod or rail elements to the roller conveyor can be provided only on one side or, otherwise, transfer regions must be provided. This results in an undesirable utilization of storage regions, since respectively adjacent stacking racks and the like become inaccessible for stock transfer. Access from only one side can be provided through a corridor; then, for each row of storage platforms or brackets, a separate corridor or path for the crane and the like must be provided. The result is a storage structure which is undesirable from a structural point of view since any projecting brackets or shelves from upright supports are loaded only on one side, thus resulting in an unbalanced structure.

Various stacking structures for symmetrically loaded or symmetrically arranged bins, shelves or brackets, are known; use of such storage stacks or racks, however, is difficult with material support systems from the storage region to a roller conveyor since the material must be transferred from one hoist or crane in alignment with one row of brackets or bins to another crane which may be in alignment with the roller conveyor. This substantially increases the transfer time between the roller conveyor and the respective storage platform or bracket system, and substantially increases the complexity of the apparatus and the cost of the system.

THE INVENTION

It is an object to provide a repositioning apparatus and system for elongated goods, especially for loading and unloading of elongated goods on or from a roller conveyor which, for example, may be associated with a machining apparatus, such as a cut-off saw or the like, and in which the roller conveyor can be accessed from two sides with the elongated goods, so that the elongated goods can be stacked or stored on both sides of the roller conveyor, without transfer of the goods from a hoist or crane to another hoist or crane, thus further reducing the apparatus and time requirements upon repositioning of elongated goods.

Briefly, frame elements are located adjacent the roller conveyor which carry guide tracks positioned in a plane essentially transverse to the roller conveyor and at an upwardly directed inclination, so that the guide tracks will have, rougly, V configuration with respect to the roller conveyor. A plurality of movable support arms are positioned along the roller conveyor to extend, for example, between individual rolls of the roller conveyor, the support arms being movable from a position beneath the upper surface of the rollers of the roller conveyor to pick up or release elongated goods thereon, and a position substantially above the roller conveyor and, due to the inclination of the guide tracks, laterally removed from the roller conveyor.

The arrangement permits a single hoist or crane to pick up goods from either the right of the left side of the roller conveyor and position the goods on the movable support elements in the guide tracks on either the right or the left one of the legs of the V-shaped frame structure.

The system, thus, provides the possibility to transfer rods, rails or similar materials, or cassettes carrying such materials, on respective movable support elements or support arms on either side of the roller conveyor, or to remove them therefrom. No requirement of a specific side from which a holder for the elongated goods approaches the support elements or support arms, which are preferably arranged in a row, is made. Of course, the crane or hoist should be capable of covering the span between the upper end of the frame element or frame structure to which the respective support elements can be moved. The system is preferably so arranged that either the corridor between the free space of the bins or shelves, and in which the roller conveyor is located, is wide enough to provide for clearance at the upper sides of the V-shaped frame structure or the stacks carry shelves or bins only above the upper level of the frame element structure.

In accordance with a feature of the invention, two rows of respectively movable support elements are provided, movable in an inclined path between the rolls of the roller conveyor and upwardly therefrom. This arrangement permits one of the rows of support elements to place elongated goods on the roller conveyor, for example by downward movement, whereas the other row temporarily supports goods which already have been treated or handled, so that they can be carried away by the crane or hoist, to be replaced by another rail, rod element or cassette when the row of support elements which carries the prior elongated goods has been lowered to place them on the roller conveyor. The system, thus, and especially when integrated with the movement of the roller conveyor, provides for a repositioning apparatus for elongated goods which, by simultaneous and opposite movement of the respective support elements or support arms ensures essentially continuous operation of the roller conveyor, without dead time of the machine tool, for example a cutter or so, to cut material being supplied thereto to size. Further, sufficient time is available for interaction with the support carrier for the goods suspended, for example, from a crane, hoist or the like, especially if the support carrier is so arranged that it can pick up material from storage stacks or racks located on either side of the roller conveyor, for example by being fitted with essentially balanced inverted T-shaped hangers. The overall saving in space and support structures becomes substantial.

Inclining the guide tracks with respect to each other and the roller conveyor, so that they will extend in approximately V shape, permits placement of the overall structure including the roller conveyor into corridors or walk ways which have the customary width between shelves, and widening of corridors or repositioning of stacking shelves is not necessary.

In accordance with a preferred embodiment of the invention, the plurality of supports are connected together by a beam so that a row of supports is associated with the beam which, then, will be movable along the guide tracks for the respective support arms or support elements. Associating the respective support elements with an elongated beam results in a compact and stable construction for the respective rows of support elements. The respective opposite rows of support elements are movable independently of each other, and can be numerically controlled; there is no necessary coupling between the movement of the support elements and a support beam on one side of the roller conveyor and of the other.

The guide ways or guide tracks can be formed as U-shaped rails, the beams being coupled by the support elements to rollers running in the rails. The beams can be moved with respect to the guide tracks in any suitable manner, for example by electrically or hydraulically driven chains; in accordance with a preferred feature of the invention, the beams, coupled to the support elements which move in the guide tracks, are moved between the respective lower and upper positions by cylinder-piston arrangements coupled to the lower ends of the guide tracks and the beams and/or the support elements, respectively.

The support elements themselves may have register stops or alignment stops thereon, to provide for predetermined positioning of the goods on the roller conveyor. Preferably, such stops are rotatable rollers. The upper edges of the respective rows of support elements may be slightly inclined with respect to a horizontal direction, for example in the direction of the rollers forming the stops. This ensures that any material which is deposited by the cranes on the support elements will slip or slide against the roller stops, to be prepositioned thereby, which prepositioning is so arranged that it matches the positioning arrangement on the roller conveyor itself. This provides for prepositioning and avoids any uncontrolled movement of the material on the roller conveyor during conveyance towards the machine tool, for example a cutting machine.

DRAWINGS ILLUSTRATING AN EXEMPLARY EMBODIMENT

Figure 3:
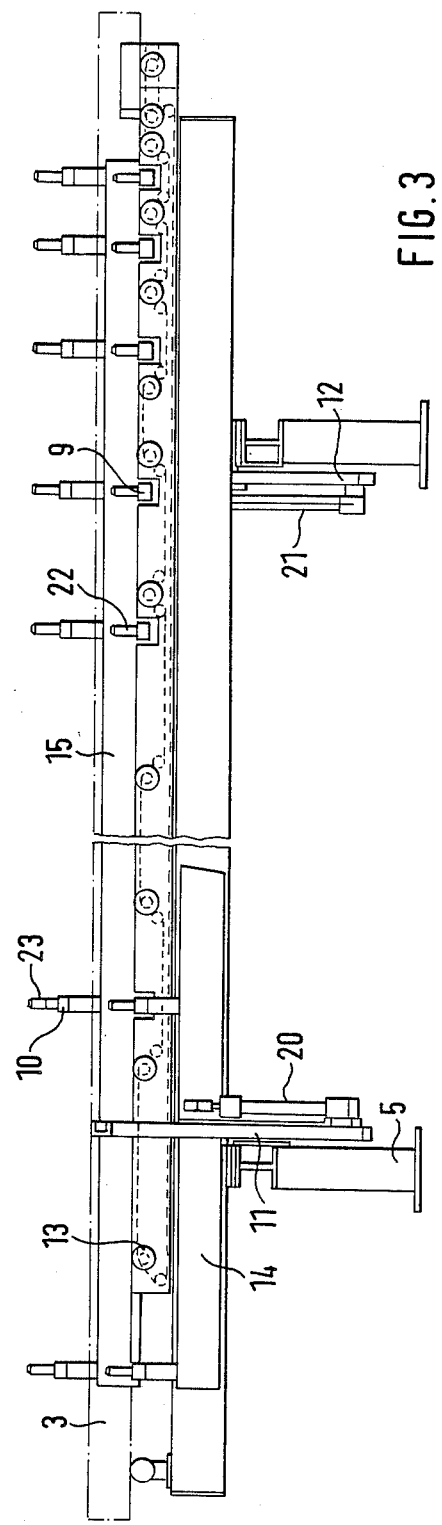

FIG. 3 is a simplified side view of the roller conveyor, and illustrating its association with the system of the present invention; and FIGS. 4-9 are schematic end views of the system of the present invention illustrating, in sequential FIGS. 4-9, the sequence of positioning of goods on the roller conveyor when goods are to be changed, for example from large-diameter round stock to small-diameter round stock.

DETAILED DESCRIPTION

Two storage racks 1 are located spaced from each other, to permit placement therebetween of a roller conveyor 13. Each one of the storage racks 1 has a plurality of stacked storage shelves or brackets 2 for elongated stock 3, which may be rails, rods or the like, of various cross-sections and sizes. It is customary to place in each one of the respective rows of shelves or brackets a specific type, model or size of goods, although this is not required. The respective shelves or brackets which form the storage bins can be spaced from each other by respectively different spacing, as required by the nature of the goods stored therein.

A passage way or corridor 4 is formed between the storage stacks 1. The corridor 4 retains a frame structure 5 which is part of a support frame for the roller conveyor and, further, forms a frame structure for the system in accordance with the present invention.

Figure 1:
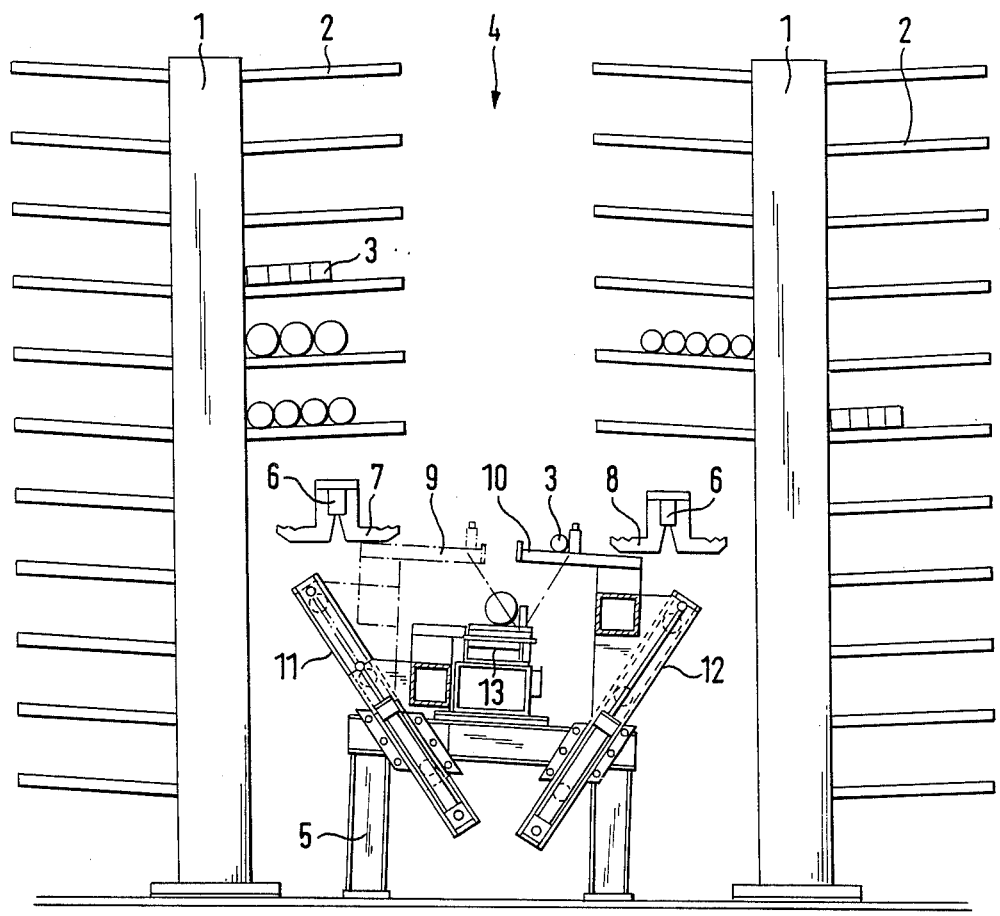
FIG. 1 is a highly schematic end view of the system of the invention, and illustrating positioning of various types of elongated stock goods in storage racks, for handling on a roller conveyor.

A support carrier 6 shown in FIG. 1 in two positions can be introduced between shelves or brackets 2. The support carrier 6 is, in effect, a load carrier, and it is shown in two positions in FIG. 1, to accept, on respective forks or tines 7, 8, goods from the shelves or brackets 2. Upon removal of an elongated stock element 3, the stock element can be placed by the load support 6 on a respective support element 9, 10. Of course, the reverse is possible, and stock elements 3 can be equally removed from the respective support elements 9, 10 by the load support 6. The support elements 9, 10 can be moved from an upper position shown in full line at the right side of FIG. 1, and in broken lines at the left side of FIG. 1, to a lower position shown in full lines at the left side of FIG. 1. As can be clearly seen, the path of movement of the support elements 9, 10 is inclined downwardly and inwardly with respect to the roller conveyor 13. Guide tracks or guide ways 11, 12 guide the movement of the respective support elements 9, 10.

The load support 6 can be moved vertically by a crane of hoist—not shown and as well known in the material handling field. Likewise, it can be moved horizontally between the two full-line positions shown in FIG. 1. When raised, the load support 6 can be raised up above the upper shelf for longitudinal movement, if desired. The system, of course, can be reversed, and rather than using a crane or hoist, the load support element 6 can be supported from the floor and moved upwardly, for example by cylinder-piston extension rods, and moved longitudinally, that is, in an out of the plane of the drawing of FIG. 1 below the respective shelves 2.

As can be clearly seen in FIG. 1, the support arms or support elements 9, 10 can be accessed by the load support 6 from either side; the tines or forks 7, 8 will fit in the longitudinal spaces between the support arms or supports elements 9, 10 so that elongated stock can be accepted or removed from either one of the tines or forks 7, 8 and from either one of the support arms 9, 10.

Figure 2:
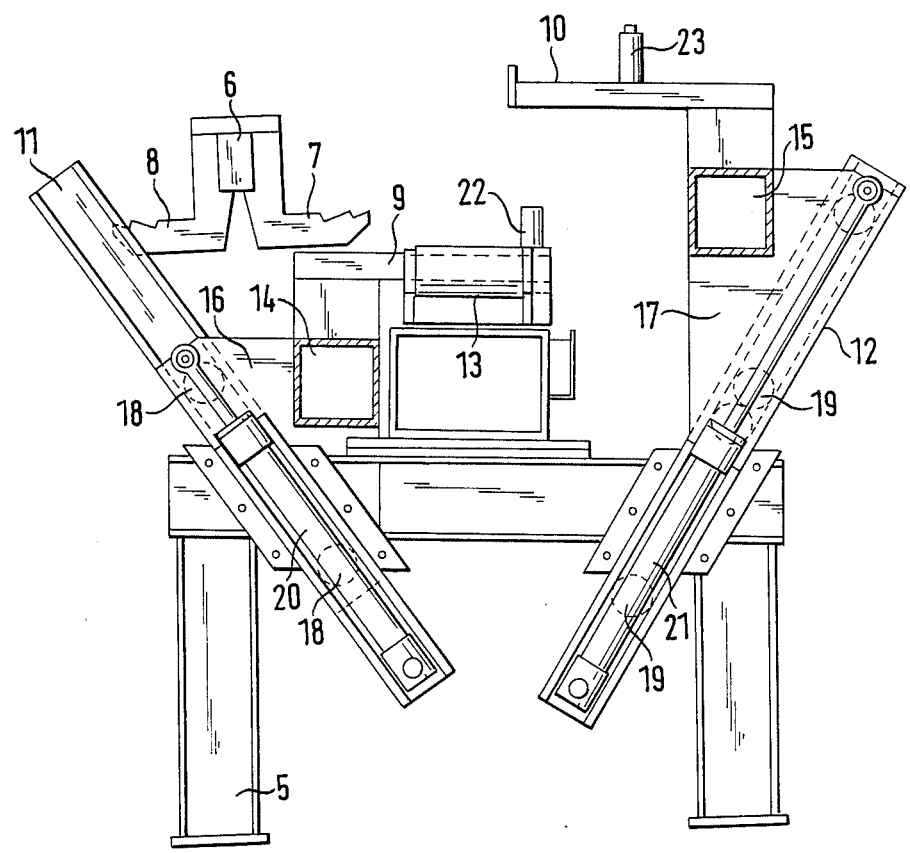
FIG. 2 is an enlarged fragmentary view similar to FIG. 1, omitting the storage stacks.

FIG. 2 illustrates in greater detail the system, in combination with loading and unloading procedures. FIG. 3 is a longitudinal view of a portion of the roller conveyor.

The frame structure 5 is formed with two aligned guide tracks 11, 12 which, with respect to the roller conveyor 13, are inclined downwardly and inwardly, to form a generally V-shaped configuration, with the roller conveyor 13 being placed in the center of the V. The inclination is so selected that, with respect to the feed direction of the roller conveyor, the guide tracks 11, 12 extend at an inclination upwardly and away from the roller conveyor.

Beams 14, 15 are moved along the guide ways. The beams 14, 15, in turn, carry the respective support arms or support elements. Each one of the beams 14, 15 is secured to an essentially triangular sheet-metal structure 16, 17 on which rollers 18, 19 are secured. The rollers 18, 19 move in the guide tracks 11, 12 which, preferably, are generally U-shaped. Thus, the path of movement of the beams 14, 15 is in the inclined path defined by the guide ways 11, 12, the beams additionally carrying the support arms or support elements 9, 10. Movement of the beams is effected by cylinder-piston units 20, 21, which are secured at one terminal end with a terminal position of the guide ways 11, 12, the other end thereof being linked to the respective triangular metal connecting elements 16, 17.

The support arms or support elements 9, 10, like the rollers of the roller conveyor 13, are slightly inclined in the same sense of inclination. The support arms 9, 10 carry respective stop rollers 22, 23, vertically located on the support arms 9, 10, to place any stock or goods 3 on the support arms or support elements ina predetermined, defined position. As best seen in FIG. 2, the stops 22, 23 may, at the same time, also form a stop element for goods on the roller conveyor 13 if they are left in the position between the individual rollers of the roller conveyor 13 after having deposited the goods on the roller conveyor 13.

Each one of the beams 14, 15 has associated therewith suitable cylinder-piston units 20, 21. Preferably, and as shown in FIG. 3, the beams 14, 15 are guided in at least two guide ways and supported on at least two respectively spaced cylinder-piston units 20, 21. The cylinder-piston units operate in synchronism, being synchronized as well known and by suitable synchronization arrangements, so that the beams 14, 15 will move essentially in the inclined path without deviation from a straight, essentially horizontally position.

The two rows of the support elements 9, 10 can be moved in an inclined path between terminal positions. The lower terminal position places the respective support arms or support element just below the top level of the rollers of the roller conveyor 13, that is, just below the plane of material or goods support thereof. In the upper terminal position, the surface formed by two of the support arms is raised to such an extent that the load supports 6 can enter with their forks or tines 7 beneath the goods on the raised or upper arms for further transport thereby. The range of lift or stroke of the cylinder-piston units 20, 21, through which the support arms 9, 10 can move, is determined, essentially, by the maximum cross-sectional area of the material or stock to be handled, and the maximum vertical cross section of the tines or forks 7, 8 of the load support 6.

As best seen in FIG. 1, the arrangement permits maintaining the width of the corridor or walk way 4 between adjacent stack supports 1 unchanged with respect to customary width. Yet, the roller conveyor can be supplied with elongated stock or goods from the stacks on either side of the roller conveyor without intervening intermediate material handling or storage.

OPERATION

The system is particularly adapted for rapid operation in synchronism, in which a rail, for example, which already had been worked on by a machine tool, such as a cutting machine, is lifted off the roller conveyor in order to place immediately subsequent to the removal of the rail, a rod element on the roller conveyor for subsequent operations thereon. Such a change in materials is illustrated, in sequence, in FIGS. 4–9. FIGS. 4–9 show, highly schematically, the sequential positions of the respective elements of the system.

Figure 4:
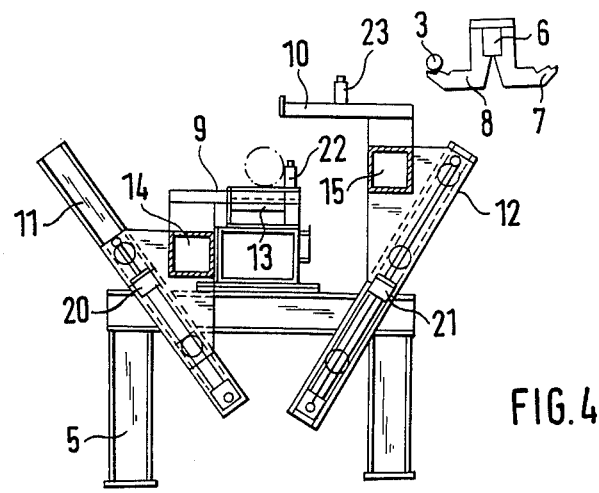
Figure 5:
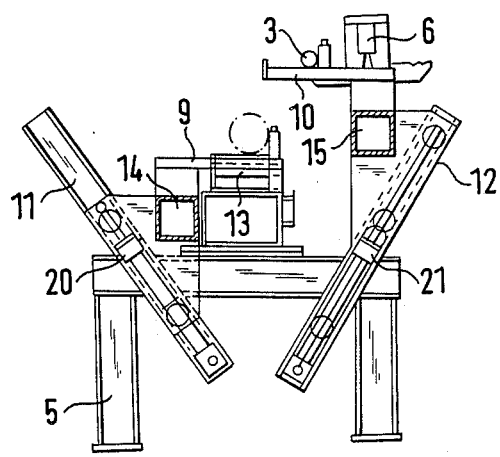

FIG. 4: the load support 6 supplies a small-diameter rod, located on tines 8 for placement on the support 10. FIG. 5 illustrates the position of the tines 8 behind the support arm 10. The support arm is in its upper position A large-diameter rod on the roller conveyor 13 is, simulataneouly, being worked on. The support arm 9, with its stop 22, provides for positioning of the large-diameter stock on the roller conveyor.

Figure 6:
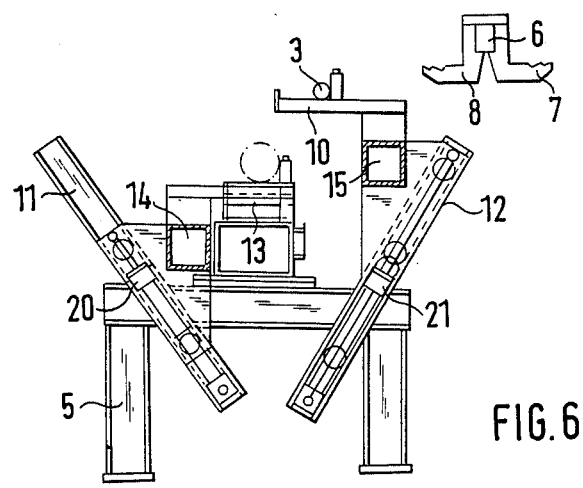
Figure 7:
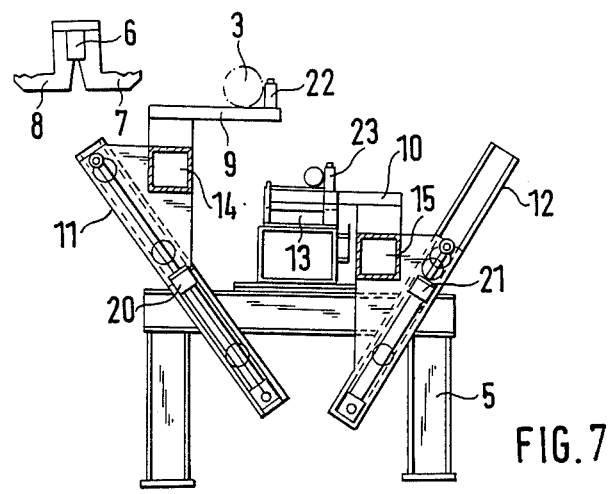

Change of stock is shown in the sequence of FIGS. 6 and 7. The support arm 9 is moved upwardly along the guide 11; this lifts the large-diameter stock off the roller conveyor 13 and, simultaneously, moves the large-diameter stock laterally towards the left. At the same time, the support arms 10 move downwardly, and also towards the left, to result in the positions shown in FIG. 7, in which the large-diameter stock is now completely raised and the small-diameter stock is on the roller conveyor 13. The stop 23 provides for a positioning of the small-diameter stock on the roller conveyor. The small-diameter stock can now be fed to a cutter or other machine tool by rotating the rolls of the roller conveyor 13.

Figure 8:
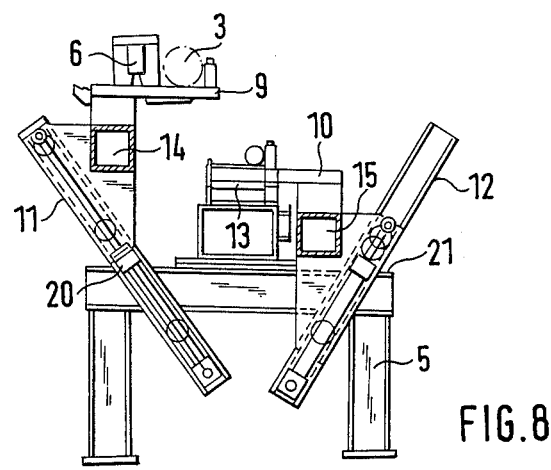
Figure 9:
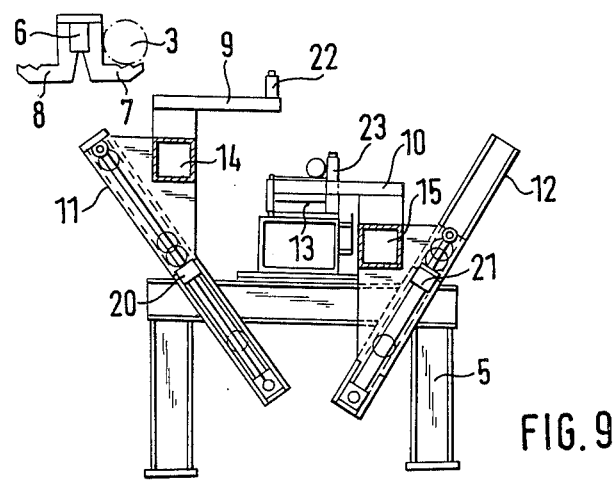

Simultaneously with placement of the small-diameter stock on the roller conveyor 13, the large-diameter stock has been raised. As shown in FIG. 8, the load support 6 is moved behind the support arm 9 and slightly therebelow, to be then raised to pick up the large-diamter stock, as shown in FIG. 9. The large-diameter stock may now be transported either towards the right or towards the left, as desired in accordance with preprogrammed placement thereof on one of the respective racks or shelves of the structures 1, 2.

Various changes and modifications may be made within the scope of the inventive concept.

I claim:

1. Repositioning apparatus for elongated goods, especially loading and unloading apparatus for elongated goods on a roller conveyor (13) having rollers for supporting the goods, comprising a frame element (5) located adjacent the roller conveyor;

guide track means (11, 12) on said frame element extending in a plane essentially transverse to the roller conveyor in an upwardly inclined direction from below the roller conveyor to above and laterally of the roller conveyor;

a plurality of movable support elements (9, 14, 16; 10, 15, 17) positioned along the roller conveyor and movable in said guide means, said movable support elements having upper support surfaces positioned in an essentially common plane for, temporarily supporting the goods when transferring the goods to and from the roller conveyor, said movable support elements being conjointly movable between a lowered position in which the upper support surfaces are below a support plane defined by the rollers of the roller conveyor (13) and a raised position in which the upper support surfaces are above the support plane and positioned laterally of the roller conveyor.

2. The apparatus of claim 1, wherein the support elements comprise a plurality of support arms (9, 10), and a connecting beams (14, 15) movable along said guide track means.

3. The apparatus of claim 1, wherein the guide track means comprise, in cross section, generally U-shaped rails; and rollers (18, 19) are provided, movable in said rails and coupled to said movable support elements.

4. The apparatus of claim 2, wherein the guide track means comprise, in cross section, generally U-shaped rails; and rollers (18, 19) are provided, movable in said rails and coupled to said movable support elements.

5. The apparatus of claim 4, wherein said rollers (18, 19) are coupled to said beam (14, 15).

6. The apparatus of claim 1, further including power means (20, 21) coupled to said frame element (5) at positions adjacent extreme lower ends thereof, and further coupled to said movable support elements.

7. The apparatus of claim 2, further including power means (20, 21) coupled to said frame element (5) at positions adjacent extreme lower ends thereof, and further coupled to said beams.

8. The apparatus of claim 6, wherein said power means comprise cylinder-piston units.

9. The apparatus of claim 7, wherein said power means comprise cylinder-piston units.

10. The apparatus of claim 1, further including positioning stop means (22, 23) located on said movable support elements for defining the position of elongated goods placed on said movable support elements.

11. The apparatus of claim 10, wherein said stop elements include essentially vertically extending projecting means.

12. The apparatus of claim 11, wherein said vertically extending projecting means include rollers which are rotatable about an essentially vertical axis.

13. The apparatus of claim 10, wherein the support elements comprise support arms or brackets (9, 10) and the support surfaces thereof are inclined in the direction of the positioning stop means.

14. The apparatus of claim 13, wherein all said support elements (9, 10) are inclined in the same direction.

* * * * *